United States Patent

[11] 3,588,252

[72] Inventor Kaspar Habosian
 Watertown, Mass.
[21] Appl. No. 859,249
[22] Filed Sept. 17, 1969
[45] Patented June 28, 1971
[73] Assignee Baird-Atomic Inc.
 Cambridge, Mass.
 Continuation of application Ser. No.
 602,010, Dec. 15, 1966, now abandoned.

[54] BACKGROUND SUPPRESSION SYSTEM FOR OPTICAL SPECTROMETER
1 Claim, 2 Drawing Figs.

[52] U.S. Cl. ........................................................ 356/82,
 356/98
[51] Int. Cl. ..................................................... G01j 3/20,
 G01j 3/30
[50] Field of Search .......................................... 356/81, 82,
 85—87, 98

[56] References Cited
UNITED STATES PATENTS

| | | | |
|---|---|---|---|
| 2,577,814 | 12/1951 | Saunderson et al. | 88/14(SE) |
| 3,163,698 | 12/1964 | Saunderson et al. | 88/14(S) |
| 3,317,737 | 5/1967 | Kopsel et al. | 88/14(SE)X |
| 2,941,443 | 6/1960 | McNally | 356/100 |

Primary Examiner—Ronald L. Wibert
Assistant Examiner—F. L. Evans
Attorney—Morse, Altman & Oates ABSTRACT: Optical spectrometers currently employ photodetecting devices to charge capacitors in measuring the intensity of monitored line spectra. The radiant energy falling upon the photodetectors, in addition to the spectral line of interest also includes background energy which is the bandspectra superimposed on the line spectra. The background amounts to noise and adversely affects the accuracy of the instrument. This invention involves the elimination of the background noise by oscillating the line spectra across the slit and sequentially charging and discharging the measuring capacitors associated with the photodetectors to average out the background noise.

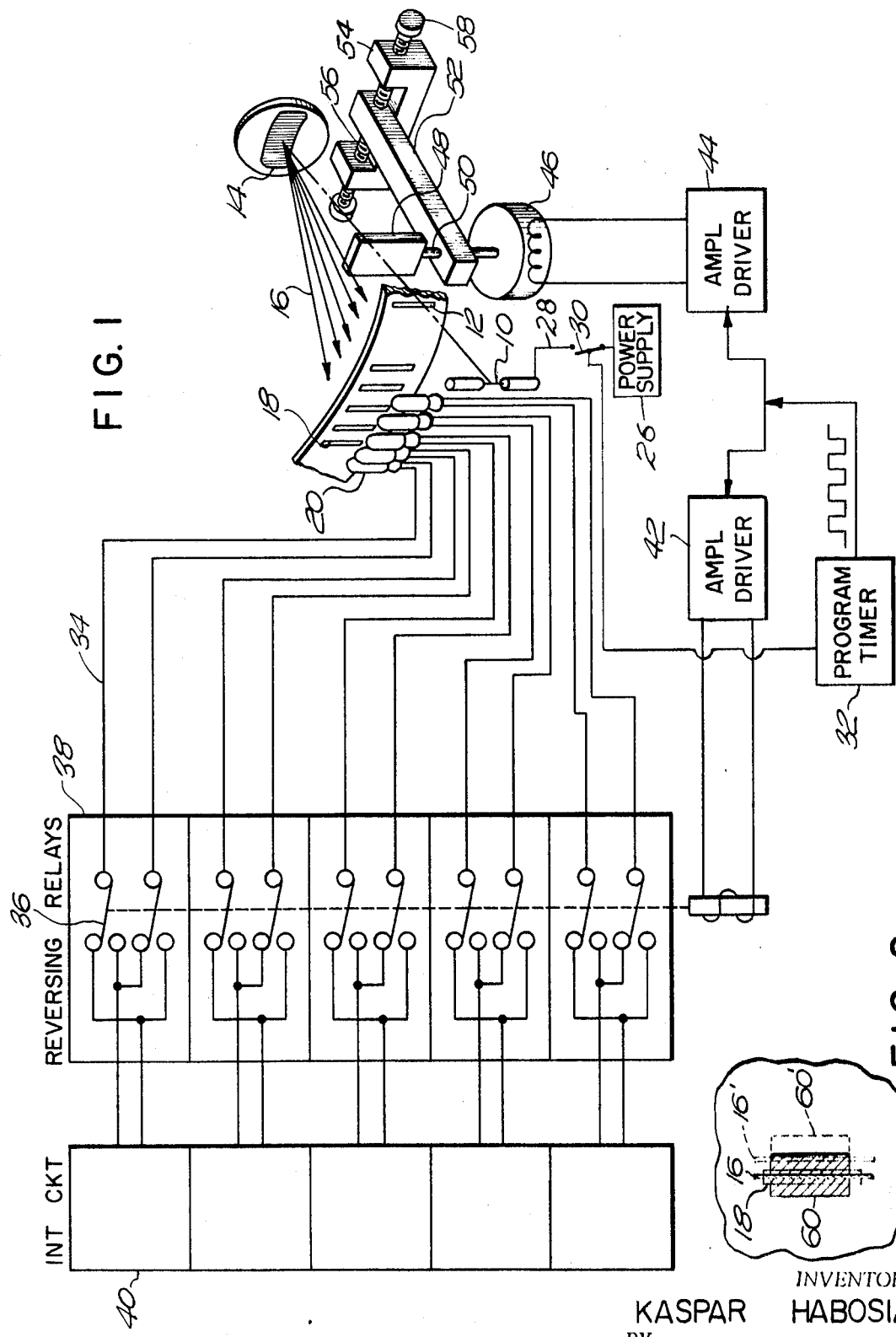

BACKGROUND SUPPRESSION SYSTEM FOR OPTICAL SPECTROMETER

This is a continuation of Ser. No. 602,010 filed Dec. 15, 1966 and now abandoned.

DISCLOSURE OF INVENTION

This invention relates generally to spectrometric instrumentation and more particularly is directed towards a novel method and associated apparatus for eliminating the effect of background energy from a monitored spectrum line in an automatic spectrometer.

Modern automatic spectrometers customarily employ photodetecting devices such as phototubes for measuring the intensity of line spectra of interest. The line spectrum is produced by exciting a specimen and projecting the image through an entrance slit against a curved diffraction grating which disperses the radiant energy into its characteristic spectrum. Photodetectors in register with exit slits respond to the energy passing through the slits. The spectrum, in addition to the spectral lines characteristic of the specimen also includes background energy which is the bandspectra superimposed on the line spectra and it is this background which is the predominant contributor to the noise level in the system. The intensity variation of the background from one operating cycle to another contributes to the noise level in the system and adversely affects the signal generated by the spectral line of interest.

By eliminating the background noise, the fluctuation of the signal level, which is variation of line intensity, will be the main contributor to the noise level and the signal-to-noise ratio would be improved. This in turn would result in improved repeatability of the instrument.

Heretofore there has been no satisfactory technique for eliminating or controlling the background noise in a spectrometer and, accordingly, it is a primary object of the present invention to provide a novel method and associated apparatus for eliminating the effect of background noise in a spectrometer readout system.

A more general object of this invention is to provide improvements in spectrometer instrumentation.

More particularly, this invention features the method of improving the signal-to-noise ratio in an automatic spectrometer by cancellation of the effect of background noise, comprising the steps of displacing the spectrum with respect to the exit slits so that the spectral lines oscillate across the slits while synchronously charging and discharging the integrating capacitors to average out the background noise.

This invention also features a novel apparatus for eliminating the effect of background noise, comprising a transparent plate mounted for angular movement between the entrance slit and the diffraction grating. Means are provided for angularly oscillating the plate so as to laterally displace the spectrum with respect to the exit slits. Operation of the plate-moving means is synchronized with relays for sequentially charging and discharging the integrating capacitors.

However, these and other features of the invention, along with further objects and advantages thereof, will become more fully apparent from the following detailed description of a preferred embodiment of the invention, with reference being made to the accompanying drawings, in which:

FIG. 1 is a somewhat schematic perspective view of a background suppression system made according to the invention, and, FIG. 2 is a detailed view showing an exit slit with spectral background superimposed on a spectral line in alternate positions.

Referring now to the drawings, the reference character 10 generally indicates an electrically excited gap in which a specimen is placed for excitation. The resulting radiation is passed through an entrance slit 12 against a curved diffraction grating 14 which disperses the radiation into a spectrum, rays of which are shown at 16. These spectral components pass through a plurality of exit slits 18 distributed in predetermined spaced relation in an arc oppositely the grating 14 for transmitting isolated wavelengths of the spectrum. A bank of photocells 20 is provided to receive wavelengths 16 with one photocell in register with a particular slit to receive a selected spectrum line 16. In response to impingement by a spectral line each of the photocells generates a signal the amplitude of which corresponds to the intensity of the monitored wavelength.

The spectrometer is of the type more specifically described in U.S. Pat. Nos. 2,937,561; 2,837,959; 3,090,278 and 2,171,882.

The spark gap 10 is energized by means of a suitable power supply 26 through lead 28 interrupted by switch 30. The switch 30 is operated by a program timer 32 which controls the sequence of operation of the system.

The phototubes 20 are connected by leads 34 through switches 36 for a bank of reversing relays 38 to measuring capacitors, integrating circuits and indicators generally indicated by reference character 40. The integrating circuitry includes a set of precision capacitors each of which is charged individually by a single phototube to a voltage corresponding to the intensity of the spectrum line monitored by the particular phototube. The charges on the capacitors may be measured by known means to obtain quantitative and qualitative information on the specimen.

The switches 36 for the relay bank 38 constitute reversing relays which are driven by the program timer 32 through an amplifier driver 42. The program timer 32 also controls an amplifier driver 44 which operates a servomotor 46 coupled to an optically transparent plate 48 of calcium fluoride or quartz, for example. This plate is rotatably supported by a shaft 50 carrying an arm 52.

In a properly aligned spectrometer a spectral line 16 will register with an exit slit 18, the image of the line being superimposed over the slit as shown in FIG. 2. In addition to the spectral line 16 a background band 60, wider than the spectral line 16, will be superimposed over the spectral line and thus will contribute to the radiant energy measured by the associated photodetector. Since the background band is extraneous noise it interferes with the accurate measurement of the intensity of the spectral line. According to the invention the noise effect contributed by the background may be eliminated by laterally shifting the spectrum so that the double image of the spectral line and superimposed background will be displaced from register with the exit slit and only the background portion of the image will register with the slit. The spectrum is then shifted back to its original position with both superimposed images in register with the slit. When both the spectral line and the background are in register with the slit the current generated by the photodetecting device will depend upon three components, namely, the intensity of the element line spectra, the intensity of the background band spectra and the dark current in the photomultiplying device. When the spectrum is shifted by angular movement of the plate 48, the spectral line will be laterally displaced and the element line will no longer register with the exit slit. In this condition the current generated by the photodetector depends only upon the intensity of the background band spectra and the photomultiplier dark current.

Assuming that the background bands are homogenous in intensity in the vicinity of the line spectra, say within two or three line widths, and that there are no interfering lines in that region, the background current can be lumped together with the dark current. With the background current and dark current lumped together dark current mechanism may be employed to cancel the effect of both noise contributions without discrimination.

For explanatory purposes dark current may be defined as spurious current output from the photodetector during periods that the detectors are not actually measuring spectral energy. Heretofore, the effects of dark current have been corrected by various means including the use of automatic shutters operating in synchronism with reversal of the integrating capacitors or by a control system such as shown in copending application Ser. No. 375,491, filed June 16, 1965 by Donald J. Price entitled "Spectrometer Readout System" assigned to the same assignee.

In any event, in place of dark current shutters the plate 48 is employed to laterally shift the spectrum with respect to the exit slits. Rotation of the plate displaces the spectrum by a predetermined amount as shown in FIG. 1. Angular movement of the plate is limited by means of the arm 52 extending between adjusting screws 56 and 58 carried by the two legs of a yoke member 54. By selectively adjusting the set screws, the movement of the arm and the plate may be preestablished to assure repetition of the spectrum position in both cases when the lines are aligned and misaligned with the exit slits. The wear of these mechanical stops will not cause any particular problem in the operation of the instrument since in the standby mode the servo monitor system disclosed in the foregoing patents will correct for any spectrum shift due to the wear.

The plate 48 is operated by the servomotor 46 in synchronism with the reversing relays at 38 and it will be understood that the measuring capacitors are charged and discharged cyclically to average out the background noise. The reversing relays are timed so that the measuring capacitors are first charged to a voltage corresponding to the intensity of the combined line spectra and background spectra. The capacitors are then discharged by a voltage corresponding only to the background spectra. The voltage left on the capacitor will correspond to the intensity of the spectral line of interest only.

While the plate 48 has been shown as the means for displacing the spectrum with respect to the slits, obviously other measures may be employed. For example, the diffraction grating may be oscillated back and forth about a vertical axis or the array of exit slits may be laterally shifted by suitable means. For convenience the use of the plate and servomotor is the preferred means for achieving spectrum shift.

Having thus described the invention what I claim and desire by Letters Patents of the United States is:

I claim:

1. A background suppression system for an optical spectrometer comprising:
   a. a plurality of exit slits and a single entrance slit arcuately distributed in predetermined spaced relation,
   b. source means for exciting a specimen to be analyzed,
   c. optical means including grating means for imaging a spectrum against said plurality of exit slits,
   d. said spectrum including a plurality of spectral lines and a band spectra,
   e. a photodetector in register with each of said exit slits,
   f. capacitor means operatively connected to each of said photodetectors,
   g. an optically transparent refracting plate mounted for angular oscillating movement in the optical path of said spectrometer between said entrance slit and grating means for moving all of said spectral lines in and out of register with said plurality of exit slits while said band spectra remain in register with said plurality of exit slits,
   h. servo means drivingly connected to said plate for oscillating said plate angularly with respect to said optical path,
   i. switching means including reversing relay means interposed between said photodetectors and capacitor means for controlling the charging and discharging of said capacitor means, and
   j. program timer means electrically connected to said servo and switching means for synchronously controlling the angular oscillating movement of said plate via said servo means and the charging and discharging of said capacitor means by said switching means, said capacitor means being charged when said spectral lines and band spectra are in register with said exit slits, said capacitor means being discharged when said spectral lines are out of register and said band spectra are in register with said exit slits, whereby the effect of said band spectra is averaged out.